United States Patent [19]

Shigeoka et al.

[11] 4,284,653

[45] Aug. 18, 1981

[54] PROCESS FOR HANDLING AND PROCESSING FISH MEAT

[75] Inventors: Ritsuo Shigeoka, Hachioji; Eizo Nagahisa, Sagamihara; Takafumi Yamauchi, Hachioji, all of Japan

[73] Assignee: Nippon Suisan Kabushiki Kaisha, Tokyo, Japan

[21] Appl. No.: 111,007

[22] Filed: Jan. 9, 1980

[30] Foreign Application Priority Data

| Jan. 13, 1979 | [JP] | Japan | 54-3165 |
| Jan. 13, 1979 | [JP] | Japan | 54-3166 |
| Dec. 18, 1979 | [JP] | Japan | 54-164307 |

[51] Int. Cl.³ .................... A22C 25/00; A23L 3/36
[52] U.S. Cl. .................... 426/312; 426/318; 426/321; 426/643
[58] Field of Search ............... 426/312, 314, 318, 320, 426/643, 321

[56] References Cited

U.S. PATENT DOCUMENTS

| 1,815,227 | 7/1931 | Barry et al. ............... 426/643 X |
| 3,206,275 | 9/1965 | Sair et al. ............... 426/312 X |
| 3,996,386 | 12/1976 | Malkki et al. ............... 426/643 X |
| 4,021,585 | 5/1977 | Svoboda et al. ............... 426/318 X |
| 4,207,354 | 6/1980 | Haga et al. ............... 426/643 X |

FOREIGN PATENT DOCUMENTS

| 46-18586 | 5/1971 | Japan ............... 426/643 |
| 49-24661 | 6/1974 | Japan ............... 426/643 |

*Primary Examiner*—Robert A. Yoncoskie
*Attorney, Agent, or Firm*—Wenderoth, Lind & Ponack

[57] ABSTRACT

A process for handling and processing fish meat contaminated with sporozoa which comprises adding one or more substances which inhibit thiol protease to the fish meat.

8 Claims, No Drawings

PROCESS FOR HANDLING AND PROCESSING FISH MEAT

BACKGROUND OF THE INVENTION

The present inventin relates to a novel process for handling and processing fish meat. More particularly, the present invention is concerned with a process for utilizing fish meat contaminated with sporozoa as normal fish meat by adding a substance which inhibits thiol protease (hereinafter referred to as TPI) to the fish meat contaminated with sporozoa to prevent the development or increase of a jellied condition.

In recent years, the expansion of the fishing grounds and the variation in the fish to be caught have given rise to a new problem, which is a so-called jellied condition in which the fish meat is spottily or wholly softened and liquified due to the development of a jellied condition in certain species of fish. This represents a great problem in the fishery field.

This jellied condition has been heretofore found in tuna and swordfishes in our country. Fish which develop such jellied conditions do not give off any offensive smell and do not exhibit any significant variation in pH. This phenomenon is aparently different from putrefaction. It is known that this phenomenon is ascribable to the parasites of minute sporozoa belonging to the class of protozoa. It is also known that such sporozoa are never parasitic with respect to human beings and are harmless to the human body because there has been no incidence of health problems, even when fish in a jellied condition has been eaten raw.

The jellied fish, although safe and harmless, as described above, cannot be utilized and processed on an economically feasible basis. For example, such jellied condition which occurs in fish, even in a very short period of time after they are caught, detracts greatly from the commercial value of the affected fish. Fish meat is liquified due to the development of a jellied condition and the final product, consisting only of bone and skin, is obtained in the production process of the dried salted fish. When a kneaded meat is prepared from jellied fish meat, the kneaded meat exhibits no gel-forming capability and remains in a curd state after heating. Even when only a small amount of jellied fish is incorporated into kneaded meat from a normal fish, the bonding capability of the meat is lost which results in "neriseihin" having no elasticity, i.e., a poor gel forming capability. Accordingly, jellied fish cannot be used at all for industrial purposes. Also, the fish meat in a jellied condition cannot be used as a filler for a normal kneaded meat. Under these circumstances, fish meat in a jellied condition is useless.

In view of the above described circumstances, we have previously made an epochmaking invention, which produces good processed fish meat from a jellied fish, by adding egg white to the fish to prevent such jellied condition.

However, this process was not fully satisfactory in that the taste and smell of the egg white were imparted to the processed fish meat and it is difficult to cause the egg white to penetrate into the tissue of the fish meat.

As a result of further studies, we have found that after the host has died, the sporozoa produces a proteolytic enzyme which is a thiol type protease and this protease is a direct cause of the jellied condition. We have also found that when a material inhibiting the activity of the thiol type proteolytic enzyme is added to and caused to penetrate into a fish meat contaiminated with sporozoa, the occurrence of jellied condition is effectively prevented without any side effects on the fish meat. These findings form the basis of this invention.

SUMMARY OF THE INVENTION

The present invention provides a process for treating and processing a fish meat contaminated with sporozoa, which comprises adding one or more TPI substances to the fish meat.

DETAILED DESCRIPTION OF THE INVENTION

A fish meat contaminated with sporozoa is used as a raw material. The jellied condition occurs in a fish meat on which sporozoa belonging to the Chloromyxum genus, Kudoa genus, Unicapsula genus and the like of Myxosoporida which belongs to Cnidosporidae or parasitic. The term "jellied condition" refers to a fish meat which is partially, spottily, or wholly softened. Fish meat contaminated with sporozoa as referred to herein includes fish meat ranging from that which has the possibility of jellying due to the parasites of the above mentioned sporozoa but which is not yet in a jellied condition and outwardly looks like a normal fish meat with no apparent softening and that which is partially jellied and softened due to the parasites of the above mentioned sporozoa.

Examples of fish on which the sporozoa are parasitic are species of flatfish (flounder, sole, halibut, plaice, etc.), tuna, swordfish, barracouta, salmon, bass, flyingfish and dolphin fish. The present invention is applicable to any of these fish, but its application is not limited to the above mentioned fish species.

TPI which was newly found to be effective for the prevention of jellying of fish meat contaminated with sporozoa is added to the fish meat.

The term "substance which inhibits thiol protease (TPI)" refers to a substance inhibiting thiol protease when a proteolytic enzyme is classified, on the basis of a catalytic residue, into serine protease, thiol protease, acid protease and metal protease. However, the substance which inhibits thiol protease (TPI) includes a substance specifically inhibiting thiol protease only and a substance inhibiting at least one member of other proteases in addition to thiol protease.

Because the present invention is directed to raw material for foodstuffs and foodstuffs, all TPI materials which are harmless from the standpoint of food sanitation are available. Examples of the TPI usable for the present invention are culture fluid, culture extracts, culture concentrates, refined filtrate and dried products thereof of Actinomycetaceae, i.e., [Streptomyces albireticuli (IFO12737), Streptomyces roseus (IFO12818), Streptomyces resochromogenes (IFO3363) ] or Aspergillus species [Aspergillus japonicus (IFO4060)], antipain, chymostatin, leupeptin, extracts of fish eggs [salmon roe], bee poison, potato, lily bulb, green onion, pineapple, rice bran and refined products thereof, and the pseudo globulin fraction of egg white. As the extract of potato and refined products thereof, use is made of an extract liquid prepared by extracting mashed raw potato with water and the refined products thereof and waste liquid from a potato starch factory or refined products thereof. As the protease inhibitor present in egg white, a trypsin inhibitor (which belongs to serine protease inhibitors) of an ovomucoid fraction is well known. However, we have found that when the ovomucoid fraction, instead of the TPI, is added to jellied fish meat, it is entirely useless, and that a pseudo globulin fraction (hereinafter referred to as GP) which has not been heretofore known as a protease inhibitor is very effective.

Furthermore, the substances which inhibit thiol protease include sulfites (sodium sulfite, sodium hydrogen sulfite, sodium metabisulfite), nitrites such as sodium nitrite, chlorites such as sodium chlorite, hypochlorous acid or hypochlorites such as sodium hypchlorite, calcium hypochlorite, bleaching powder, bromates such as potassium bromate, chlorine dioxide, hydrogen peroxide, benzoyl peroxide, ammonium persulfate, calcium oxide and alum. These materials may be used singly or in combination. Most of these chemical synthetic products are also allowed as additives for foodstuff, and their addition presents no problem from the standpoint of food sanitation. Many of these materials are in solid state at room temperature, but some of these, e.g., chlorine dioxide, are in a gaseous state at room temperature. These materials may be added as a solid powder or gas, or a solution in water, as described hereinafter.

In accordance with the present invention, it was found that these substances are effective for preventing jellying of fish meat or the progress of jellying.

In accordance with the present invention, the above mentioned TPI are added to the above mentioned fish meat contaminated with sporozoa. In the case where the fish meat is subjected to heating, the substance may be added in any process before the heating process by any suitable method. However, the method of addition and the periods of addition depend upon the processed product and the production process thereof.

A general process for producing minced meat "otoshimi", kneaded meat "surimi" and "neriseihin" (the products made from kneaded fish meat, such as kamaboko, chikuwa, hampen, etc.) from a fish meat will be simply described. Caught fish on board a fishing vessel are headed and gutted as they are or after freezing and thawing. Then, the dressed fish are subjected to removal of their fins and tails and are cut into fillets. After a so-called pre-treatment including removal of the uneatable portions, cutting and washing has been completed, the resulting dressed fish or fillet is subjected to a roller type or stamp type fish meat separator to obtain minced meat having a size of from 5 to 7 mm. The minced meat may be used as a raw minced meat or shaped and frozen. In many cases, this minced meat is processed into kneaded meat.

In processing the kneaded meat from the minced meat, the minced meat is soaked one to several times with a large quantity of water. The soaked meat is hydroextracted by means of a rotary sieve or screw press. Thereafter, the hydroextracted meat is uniformly mixed, if necessary, with sugar, phosphates and the like. The resulting mixture may be used as a raw kneaded meat or shaped and frozen.

These raw and frozen kneaded meats may be used as they are. However, these kneaded meats are ordinarily processed into "neriseihin". In this case, the raw or thawed kneaded meat is mixed with sodium chloride, starch, fat or oil, seasoning, binder and the like and the mixture is ground by a grinder. Then, the ground mixture is shaped and the resulting shaped product is heat coagulated by boiling, broiling, steaming, frying thereby to obtain "neriseihin" such as "kamaboko", "chikuwa", fish ball and "agemono".

In the case where the raw fish to be processed is fresh and has been maintained in good condition, the minced meat may be directly subjected to the grinding process by omitting the soaking and hydroextracting processes. Alternatively, after the minced meat is hydroextracted or hydroextracted, frozen and thawed, it may be subjected to the grinding process.

As described above, the process of the present invention may be applied to a process for producing raw or frozen minced meat, raw or frozen kneaded meat and various "neriseihin" using these intermediate products. The above mentioned TPI may be added in any process by various methods. For example, a fresh fish immediately after being caught or a frozen fish frozen immediately after being caught may be soaked in or washed with a solution of the TPI for a certain period of time before the pre-treatment. Alternatively, during the time the caught fish is pre-treated into dressed or fillet or after the pre-treatment has been completed, a solution of the TPI may be applied.

When the minced meat is soaked in water, the above mentioned TPI may be added to the water thereby to cause the penetration of the TPI into the meat. The TPI in the form of a powder or granules may also be added together with sugar, phosphates, sodium chloride and seasoning during the mixing or grinding process. When the raw or frozen minced meat is prepared, the TPI in the form of a solid may be added to the minced meat and the mixture lightly blended. Alternatively, the TPI in the form of a gas or solution as a spray may be blown onto the minced meat.

Accordingly, in the production of minced meat, kneaded meat and "neriseihin" from a fish meat contaminated with sporozoa, the TPI may be added immediately after the fish are caught, after the thawing of the frozen fish frozen immediately after being caught, during the pre-treatment, after the pre-treatment and before freezing, during the soaking and mixing process, or during the grinding process. Alternatively, the TPI may be added in two or more processes, for example, two times during the soaking process and the mixing process or during the soaking process and the grinding process.

In the case where the TPI is added in the form of a liquid, in addition to the soaking in a liquid containing the TPI and the washing and soaking by such a liquid, various impregnation means may be used which include injection of such a liquid into the interior of the fish meat by an injector or ripeshooter, coating or spraying of such a liquid on the surface of the fish meat, ice glazing the surface by soaking frozen fish in or passing it through such a liquid.

Accordingly, in accordance with the present invention, in the production of the minced meat, kneaded meat and "neriseihin", the TPI may be added, in the form of a liquid, solid or gas, to various configurations and conditions of fish meat by various addition methods.

With regard to processed fish products other than the minced meat, kneaded meat and "neriseihin", as described above, a round fresh fish or frozen fish is dressed by removing therefrom uneatable portions such as gills, internal organs, heads, fins, tails and bone and then subjected to pre-treatment such as cutting and washing. Thereafter, depending upon the extent of the pre-treatment, the fish meat is processed into semi dressed, pan dressed, chunk, steak or diced product, in addition to dressed or fillet product. The resulting products may be eaten as they are or utilized as an intermediate product for various processed marine products.

The processed marine products are generally classified into dried fishes, salted fishes, seasoning products, canned foods and frozen products (the seasoning products include "neriseihin", but the "neriseihin" has been previously described, and thus, the "neriseihin" is not further described herein). These products may be prepared by different methods. Dried fish includes: dried fish prepared directly by drying the pre-treated fish meat; boiled and dried fish prepared by boiling and drying; roasted and dried fish prepared by roasting and drying; dried salted fish prepared by salting and drying freeze dried fish prepared by freezing and drying; broiled and dried fish prepared by broiling and drying; seasoned dried fish prepared by seasoning and drying; and smoked fish prepared by smoking.

Salted fish may be prepared by a pickle curing method wherein the pre-treated fish meat is soaked in brine or by a dry salting method wherein sodium chloride is spread on the fish meat in semidressed or opened form and the salted meat is aged and frozen. Seasoned products include a fermented fish paste prepared by salting fish meat by the pre-treatment processing method, fermenting and aging the salted meat, a picled fish prepared by pickling and fermenting fish meat, a boiled seasoned fish prepared by seasoning fish meat while boiling, and a seasoned dried fish prepared by seasoning and drying fish meat. After the pre-treatment, the resulting fish meat may be packed into a can together with a seasoning liquid, heated and sterilized thereby to obtain a canned food. The pre-treated fish meat may also be coated with flour and process-frozen thereby to obtain a frozen food such as a fishstick.

As stated above, the intermediate products in various forms which are obtained from fresh or frozen fish by subjecting the fish to various steps involved in the pre-treatment may be processed into various processed products by various processing methods. In accordance with the present invention, the TPI may be added in any process until the processed product is obtained by various addition processes. That is, the addition of the TPI may be carried out during the time a fresh or frozen fish is in a round condition before the pre-treatment, during the pre-treatment or during one or more processes selected from salt soaking, salt spraying, soaking and seasoning processes, after the pre-treatment is completed, by means of a soaking, washing, dipping, injecting, coating, spraying or ice glazing of a solution of the TPI or a smoking of the TPI in the form of a gas or an addition of the TPI in the form of a powder.

In the case where frozen fish in pulverized form is used as an intermediate material for frozen foods, the TPI in powder form may be added when the frozen fish is pulverized.

Whatever method may be used, if a heating process is involved in the production process, the addition of the TPI must be carried out before the heating process. In general, it is most preferable that the addition of the TPI be carried out at as early a stage as possible, for example, immediately after the fish is caught or immediately after a frozen fish is thawed. When the TPI is added to a fish body by an impregantion method, it is preferable that the scales be removed from the fish. It is also desirable that the addition of the TPI be carried out in a short period of time at a low temperature, preferably, not greater than 15° C. in order to maintain the freshness of the fish and to prevent a deterioration in the quality of the fish.

The quanity of the TPI added depends upon the member of the sporozoa which are parasitic on a fish or the degree of jellying, the shape and size of the fish meat and the type of the TPI. For example, for a small-sized meat such as minced meat and diced meat, the addition of the TPI in only a small quantity for a short period of time is satisfactory. In general, if the TPI is added in a quantity of not greater than 0.2% with respect to the weight of the fish-meat, a remarkable effect is obtained.

In the case where hydrogen peroxide is used in a high concentration, the fish meat foams and becomes porous. Accordingly it is necessary, in this case, to remove the foam. The addition of the TPI in such a concentration is effective for preventing jellying of the fish meat or increase of jellied condition, and at the same time, it has no adverse effect on the taste and odor, mouth feel and quality of the final product.

The quantity of the TPI added generally also depends upon the concentration of a proteolytic enzyme of fish meat contaminated with sporozoa. For example, North Pacific hake on which sporozoa are parasitic has a proteolytic enzyme activity of from a low level up to 30,000 units. The quantity of the TPI added is adjusted in such a manner that the minced meat, kneaded meat and "neriseihin" and other products to which the PTI is added exhibit a proteolytic enzyme activity of not greater than 1,000 units, preferably not greater than 200 units and in the case of other products not greater than 2,000 units, preferably not greater than 800 units.

The effectiveness of the TPI can be evaluated by the percent reduction of proteolytic enzyme activity after the addition of the TPI, in other words, the degree of inhibiting proteolytic enzyme activity. As is shown in Example 1 described hereinafter, all of the TPI according to the present invention exhibit excellent capability of inhibiting proteolytic enzyme activity.

All of the TPI can easily penetrate into the interior of fish meat. However, it is sometimes difficult to cause the TPI to penetrate rapidly and uniformly into fish meat by an impregnation treatment such as soaking and washing and dipping depending upon the size or type of the fish meat. In such a case, it is useful to resort to a measure for promoting impregnation treatment including the use of a penetrating coagent. Examples of the penetrating coagent are condensated phosphates (sodium polyphosphate, sodium pyrophosphate, sodium hydrogen pyrophosphate, sodium metaphosphate, sodium hydrogen metaphosphate and potassium salts thereof), sugar fatty acid esters, sorbitan fatty acid esters, propylene glycol, propylene glycol fatty acid esters, and glycerol fatty acid esters. These compounds may be used singly or in combination during the impregnation process. The quantity of the penetrating coagent added is preferably in the range of from 0.1 to 5% by weight with respect to a solution containing the TPI.

As a measure of promoting the impregnation treatment, irradiation with supersonic waves by a supersonic wave oscillator of electrostriction or magnetostriction type may be utilized. For example, in the case of a magnetostriction type supersonic wave oscillator, the frequency is preferably in the range of from 16 to 30 Kc.

The penetrating coagent may be used for any impregnating treatment including soaking, washing, dipping, injecting, coating, spraying and ice glazing. The impregnating treatment promotion by supersonic waves is particularly useful for the soaking or dipping impregnating treatment.

"Neriseihin" is usually produced by processing caught fish on board the fishing vessel to produce kneaded meat, freezing the kneaded meat, transporting the frozen meat to land after several days or several months, then thawing the meat and processing the thawed meat into "neriseihin". However, in the case where the caught fish are immediately frozen on board the fishing vessel and the subsequent processes are applied to the frozen fishes on land, the caught fish may be pretreated into dressed or fillet and the resulting meat may be frozen, the subsequent processes being carried out on the land. In the case of other products, it is often that pre-treatment until some suitable steps can be applied to caught fish is carried out on board the fishing vessel and the pre-treated fishes are frozen, the subsequent processes being carried out on the land. Sometimes, caught fish are frozen in the round state without any pre-treatment, and all processes are carried out on land.

If the TPI is added to fish meat contaminated with sporozoa as described above, it is possible to prevent jellying of the fish meat or the progress of the jellied condition contained in the fish meat, whereby fresh fish, frozen fish, fish meat to which light treatments have been applied, and various processed products which have the same properties as those resulting from normal fish meat can be obtained. In addition, the TPI penetrates well into the fish meat.

It is to be understood that an intermediate material, such as fillets, minced meat and kneaded meat, to which the TPI is added may be mixed with an intermediate material resulting from a normal fish meat and the mixture may be eaten. It is also to be understood that fish meat of two or more species may be mixed together and the resulting mixture may be subjected to the process of the present invention. In addition, the addition of the TPI can be advantageously carried out in combination with a process comprising egg white which has been previously invented by us, i.e., the TPI can be used in combination with egg white.

According to the present invention, it is possible to convert fish meat contaminated with sporozoa into a product equivalent to normal fish meat. In the past the fish contaminated with sporozoa were considered to have no utility and thus were not sought after or if caught, were discarded. In addition, zhe TPI penetrates well into fish meat without any adverse effects. Accordingly, the present invention greatly contributes to the useful utilization of valuable marine resources.

The present invention will be further illustrated by the following examples.

EXAMPLE 1

North Pacific hake (*Merluccius products*) on which the sporosa were parasitic was minced and homogenized with two volumes of water. After standing for 2 hours, the homogenate was centrifuged (15,000 xg, 20 minutes) under cooling condition, and the supernatant was dialyzed against tap water for 24 hours. The residual liquid remaining after the dialysis was heated at 50° C. for 20 minutes. The resulting precipitate was removed under cooling by centrifuge (15,000 xg, 30 minutes). The supernatant liquid was designated an aqueous extract of fish meat with jellied condition. The extract had a proteolytic enzyme activity of 60 units/ml/min. as was assayed at 40° C. with respect to a substrate of urea-denatured hemoglobin (pH=3).

Separately, 3 ml of McIvaine buffer solution (pH=3) was added to 1 ml of urea-denatured bovine hemoglobin (at a concentration of 4%) to prepare a substrate solution. 1 ml of a 1:1 mixture of the above obtained extract and a solution of various TPI was added to the above prepared substrate solution. The resulting mixture was incubated at 40° C. for 5 minutes. Thereafter, 5 ml of a 5% trichloroacetic acid was added to the mixture to allow the reaction to stop. The reaction mixture was left to stand for 30 minutes at room temperature. Then, the mixture was filtered through a filter paper (Toyo filter paper No. 5C). 1 ml of the filtrate was colorometrically determined at a wave length of 660 mµ by a Folin method.

A control was prepared according to the procedure described above except that the trichloroacetic acid and the extract were added in the reverse order.

The protease inhibition ratio of various proteolytic activity of the TPI is expressed as the reciprocal of the relative activity with respect to 100 of the activity of an extract prepared by adding water instead of the TPI solution. That is, $$\text{inhibition ratio (\%)} = \left(1 - \frac{\text{activity of extract and } TPI \text{ mixture solution}}{\text{activity of extract}}\right) \times 100$$

The results are shown in Table 1.

TABLE 1

Inhibition ratio of various TPI for protease of hake flesh with jellied condition

| materials | concentration (%) | inhibition ratio (%) |
|---|---|---|
| culture filtrate of Streptomyces albireticuli | 0.2* | 79.5 |
| dried product of culture filtrate of Aspergillus japonicus | 0.01* | 89.0 |
| water extract of raw potato | 0.3* | 81.7 |
| antipain | 0.002 | 72.9 |
| chymostatin | 0.002 | 97.0 |
| leupeptin | 0.002 | 99.0 |
| pseudo-globulin from egg white | 0.1* | 78.6 |
| sodium hydrogen sulfite | 0.02 | 96.1 |
| sodium sulfite | 0.02 | 93.4 |
| sodium metabisulfite | 0.05 | 96.2 |
| hydrogen peroxide | 0.01 | 100.0 |
| hydrogen peroxide | 0.001 | 86.8 |
| ammonium persulfate | 0.015 | 91.7 |
| benzoyl peroxide | 0.01 | 82.3 |
| potassium bromate | " | 98.0 |
| sodium chlorite | " | 100.0 |
| chlorine dioxide | " | 100.0 |
| sodium nitrite | " | 90.2 |
| sodium hypochlorite | " | 87.8 |
| calcium hypochlorite | " | 98.1 |
| hypochlorous acid | " | 88.5 |
| calcium oxide | " | 100.0 |
| ammonium alum | " | 89.8 |
| Δpotassium nitrate | " | −1.4 |
| Δpotassium dichromate | " | 96.1 |

Note:
*the concentration is expressed in terms of protein content.
Δcompounds other than the compounds of the present invention.

It is apparent from Table 1 that the TPI of the present invention effectively inhibit the activity of the protease produced by the sporozoa which mainly contribute to the development of jellied condition. Although some compound other than the present TPI, such as potassium dichromate exhibits a high inhibition, these compounds are unfavorable from the standpoint of food sanitation.

EXAMPLE 2

Process for producing baked fish 200 pieces of frozen fillets of Pacific hake (Merluccius productus) containing numerous spots of jellied condition having a maximum diameter of 3 mm and a minimum diameter of 0.5 mm were thawed. These fillets were divided into samples A, B, C and D each consisting of 50 fillets. 50 fillets of the sample A were dipped in a 10% aqueous solution of sodium chloride for 30 minutes and, thereafter, were broiled with salt. The sample B was treated according to the procedure described for the sample A except that 0.001% of antipain was added to the aqueous solution of sodium chloride. The sample C was treated according to the procedure described for the sample B except that 0.3% of condensated phosphate consisting of an equal amount of sodium polyphosphate and sodium pyrophosphate was added to the aqueous solution of sodium chloride. The sample D was treated according to the procedure described for the sample B except that the fillets dipped in the aqueous solution of sodium chloride were irradiated with supersonic waves having a frequency of 18 KC for five minutes by using a magnetostriction type supersonic wave oscillator manufactured by Shimada Rika Kogyo Co. while the solution was stirred.

The appearance of the fillets broiled with salt and the organoleptic test results of the fillets are shown in Table 2.

TABLE 2

|  | Sample A control | Sample B antipain | Sample C antipain + condensated phosphates | Sample D antipain + supersonic wave |
| --- | --- | --- | --- | --- |
| Appearance of a perfect fillet state, and texture of normal | 0 | 39 | 42 | 46 |
| Appearance of a perfect fillet state, but slightly softened texture | 12 | 8 | 5 | 2 |
| Muscles are softened, and partially depressed | 7 | 2 | 3 | 2 |
| Muscles are wholly softened, and crumbled | 31 | 1 | 0 | 0 |

It is apparent from Table 2 that even when the hake contains a large number of spots of fish flesh with jellied condition, when it is treated as in sample B, satisfactory results are obtained. In the case of a large-sized fish having a thick flesh as in the control, by using a combination of antipain and penetrating coagent or a supersonic wave as is in sample C or D, improved effects can be obtained.

EXAMPLE 3

Process for treating a fillet and process for producing a steaks using the treated fillet 10 Kg of frozen fillets of Australian barracouta (Thyrsites atun) which contained a large number of spots of jellied condition having a maximum diameter of 1 mm and a minimum diameter of 0.3 mm was thawed. The thawed fillets were dipped overnight in 50 l of a 1% by weight aqueous solution of sodium chlorite at 5° C. thereby to obtain 9.8 Kg of treated fillets. The treated fillets were cut into steaks having a thickness of 1 cm. These steaks exhibited no abnormal organoleptic property such as color, quality and flavor and aroma when broiled in a gas oven and were substantially the same as the flesh of normal barracoutas. A control steak subjected to no soaking treatment softened and became pasted when broiled. Consequently, it could not retain the mouth feel as a steak.

EXAMPLE 4

Process for producing a fillet block

A fresh Pacific hake containing spotted jellied condition having a maximum diameter of 1 mm and a minimum diameter of 0.3 mm which was taken up 5 hours after being caught was headed and gutted on board the fishing vessel. The resulting fish was subjected to a fillet making machine to obtain skinless fillets. The skinless fillets had a proteolytic enzyme activity of 10,000 units. Each fillet sample was washed with water containing 0.05% of sodium sulfite. Thereafter, an aqueous solution containing 0.01% of antipain, and 0.5% of each of condensated phosphates, a sugar fatty acid ester and a sorbitan fatty acid ester was sprinkled on the surface of the fillet, and the fillet was placed in a freezing pan to freeze it, whereby a frozen fillet block was obtained. The frozen fillet block had a proteolytic enzyme activity of 320 units.

This block was stored in a frozen state for 6 months and thereafter it was cut into a portion measuring 4×6×1 cm by a Birocutter (autofeeder bandsaw). This portion was crumbed with flour and fried in oil. The fried product had good mouth feel and taste. On the other hand, a control fry which was obtained according to the procedure described above except that the washing with an aqueous sodium sulfite solution and the addition of antipain were not carried out was softened and crumbled.

EXAMPLE 5

Process for producing fillets and process for fillet blocks using the treated fillets Chilean hake (*Merluccius guyi*) containing a large number of spots of jelly meat which was caught off Peru was headed and gutted on board the fishing vessel, processed into fillets by means of a fillet machine, and, further, processed into skinless fillets by means of a skinner. 10 Kg of a 1% aqueous solution of potassium bromate was injected into 1,000 Kg of the skinless fillets by means of a ripeshooter having a number of injecting needles. Thereafter, these fillets were compactly arranged in layers in a freezing pan measuring 300×600×60 m/m and immediately therafter, they were frozen under pressure by means of a contact freezer to obtain 100 fillet-blocks weighing 10 Kg.

These fillet blocks were brought to land and stored in a frozen state for 3 months. Then, these blocks were cut into pieces each measuring 25×50×9 m/m by means of a Bilocutter (autofeeder bandsaw) and a portion cutter. The resulting cuts were coated with flour and fried in oil to obtain hake portion fries. The fried products had good mouth feel and taste.

On the other hand, when no injection treatment was applied, the resulting fries consisted only of the coating because the fish meat contained in the fries had liquefied and flowed out.

EXAMPLE 6

Process for producing a dried fish

One hundred North Pacific frozen yellowfin sole (*Limanda aspera*) (one of flatfish) having a number of spots of jellied condition which are of no commercial value were thawed. Then, the yellowfin sole were gutted and their abdominal cavities were washed.

Fifty of the dressed yellowfin sole as samples were dipped for 2 hours in a 10% aqueous solution of sodium chloride into which 0.2% condensated phosphates, 0.1% potassium bromate and 0.01% hydrogen peroxide were dissolved while the solution was stirred. The flatfish were then removed from the solution and drained. Thereafter, the flatfish were dried in a low temperature dryer Dehydromaster at a temperature of 15° C. for 5 hours thereby to obtain dried salted flatfish.

The other fifty dressed yellowfin sole, as controls, were treated according to the procedure described above except that potassium bromate and hydrogen peroxide were not added to the dipping solution. Thus, dried salted flatfish were obtained.

The appearance of these dried salted flatfish and the organoleptic property with regard to mouth feel of the broiled flatfish are shown in Table 3.

TABLE 3

| | Control | Sample |
|---|---|---|
| Appearance | | |
| Number of dried flatfish retaining perfect fish body | 12 | 50 |
| Number of dried flatfish with softened and partially depressed muscle | 33 | 0 |
| Number of dried flatfish consisting of bone and skin | 5 | 0 |
| Organoleptic property with regard to mouth feel | | |
| Number of broiled flatfish whose flesh is partially in the form of a mashed potato | 22 | 0 |
| Number of broiled flatfish which is felt to be jelly or "nikogori" (gelatin) to mouth | 19 | 1 |
| Number of broiled flatfish having normal mouth feel | 9 | 49 |

EXAMPLE 7

Process for producing a dried fish

One hundred North Pacific frozen yellowfin sole containing a large number of spots of jellied condition in their muscles were thawed. These flatfish were gutted and the abdominal pores were washed. The muscles of these flatfish had a proteolytic enzyme activity of 5,000 units.

Fifty of the dressed yellowfin sole as samples were dipped in a 10% aqueous solution of sodium chloride containing 0.01% of chymostatin for 2 hours while the solution was stirred. During the dipping, the flatfish were irradiated with supersonic waves having a frequency of 18 KC for 10 minutes by using the same magnetostriction type supersonic wave oscillator as described in Example 2. Thereafter, the flatfish were drained. Then, these fish were dried at 15° C. in a low temperature dryer dehydromaster to obtain dried flatfish with salt.

Fifty of dried flatfish with salt as controls were prepared according to the procedure described above except that no chymostatin was used. The appearance of these flatfish and the mouth feel of the broiled flatfish are shown in Table 4.

TABLE 4

| | Control | Sample |
|---|---|---|
| Appearance | | |
| Number of flatfish having perfect fish shape | 26 | 48 |
| Number of flatfish whose muscle was softened and partially depressed | 22 | 2 |
| Number of flatfish consisting only of bones and skins | 2 | 0 |
| Mouth feel | | |
| Number of flatfish having flesh like mashed potato | 17 | 0 |
| Number of flatfish in the form of jelly or "nikogori" | 2 | 1 |
| Number of flatfish having normal mouth feel | 31 | 40 |

With regard to the sample, the dried flatfish with salt wherein the muscle was softened and partially depressed had a proteolytic enzyme activity of 120 units. When these flatfish were broiled and eaten, they exhibited the same taste and flavour as a conventional dried fish.

EXAMPLE 8

Process for producing fillets and process for producing a smoked product using the treated fillets A fillet of frozen North Pacific silver salmon (*Oncorhynchus kisutch*) was thawed. This salmon was found to have a large number of spores because a large number of spots of jellied condition appeared in the flesh after the salmon was left to stand in the air for 5 hours, although the spores could not be observed immediately after the thawing of the salmon. The fillet had a proteolytic enzyme activity of 4,960 units.

A pseudo-globulin liquid fractioned from the egg white to which 5% of propylene glycol, based on the liquid, was added was injected into the silver salmon fillet by means of a ripeshooter having a number of injectors. The quantity of the pseudo-globulin liquid injected was 10 g per Kg of the fillet. The resulting fillet was used as a sample.

The pseudo globulin liquid is prepared as follows. The egg white having a pH of 9.5 is introduced into a 5% aqueous solution of sodium chloride and a major portion of lysozyme contained in the egg white is crystallized, the crystal being separated from the solution. Thereafter, ammonium sulfate is added to the solution until it is semi-saturated with ammonium sulfate. The resulting precipitate is collected by means of a centrifuge. The precipitate is dissolved in a 0.25% aqueous solution of sodium chloride, and dialysis is carried out.

The resulting ovomucin precipitate fraction is removed by means of a centrifuge. The supernatant liquid is saturated with 0.43% of ammonium sulfate and a precipitate is allowed to salt out. The resulting precipitate is collected by a centrifuge, and the collected precipitate is dissolved in distilled water. The resulting solution is subjected to dialysis, and the resulting precipitate is removed by a centrifuge. The supernatant liquid is saturated with 0.43% of ammonium sulfate, and a precipitate is allowed to salt out. This salting out and dialysis are each repeated three times. A supernatant liquid obtained by centrifuging the mother liquid remaining after the last dialysis in the pseudo globulin liquid.

Then, the fillet was dipped in a 10° Be' aqueous solution of sodium chloride for 30 minutes and, thereafter, was smoked in a smoking house at 80° C. for 3 hours thereby to obtain a smoked product. The smoked product had a proteolytic enzyme activity of 10 units and excellent quality and flavour. A control smoked product obtained by the procedure described above except that only a 5% aqueous solution of propylene glycol was injected had depressed portions and bored portions.

EXAMPLE 9

Preparation of frozen raw ground fish meat 200 kg of the frozen fillet of Pacific hake containing a large number of spots of jellied condition having a maximum diameter of 3 mm and a minimum diameter of 0.5 mm was thawed. Then, fish meat was collected from the thawed hake by means of a fish meat separator. The fleshed meat had a proteolytic enzyme activity of 6,400 units. The fish meat was soaked in cold water in a quantity two times that of the meat and drained, and it was again soaked in cold water in the same quantity and drained to obtain 105 Kg of hydroextracted meat. The hydroextracted meat had a proteolytic enzyme activity of 1,280 units. 0.5 Kg of culture filtrate of Actinomyces, 3.5 Kg of sugar and 0.15 Kg of condensated phosphates were added to each 50 Kg of the hydroextracted meat and the mixture was homogeneously mixed.

A culture filtrate was prepared by inoculating Streptomyces albireticuli (IFO 12737) into a culture medium containing 1% of glucose, 1% of starch, 2% of peptone and 0.5% of sodium chloride and having a pH of 7.0, culturing the Streptomyces albireticuli under aerobic conditions at a temperature of 30° C.±1° C. for 72 hours, heating the culture medium at a temperature of 100° C. for 30 minutes after the culturing, and filtering the medium on a filtering paper. Each of 10 Kg lots of the mixture was charged into a container and rapidly frozen at a temperature of −30° C. The frozen meat was removed from the container, placed in a polypropylene bag, and sealed. The sealed bag was stored under freezing conditions for 6 months. A control was treated under the conditions described for the testing sample, except that 0.5 Kg of water was added instead of the culture filtrate of Actinomyces.

The frozen testing and control kneaded meats thus obtained were thawed and subjected to a model estimation method of elasticity. In testing the elasticity, the kneaded meats are usually formed into a model product of a Japanese style fish meat paste and the model product is evaluated for quality. The thawed testing and control samples had a proteolytic enzyme activity of 30 and 1,100 units, respectively.

The samples were tested for jelly strength, two-fold and fourfold cracking, and biting quality. In the following examples, the jelly strength is measured with the Okada-type jelly strength meter using a plunger having a diameter of 5 mm. A round sliced sample having a thickness of 3 mm was evaluated for folding property according to the following five grades: AA: no crack by fourfold, A: no crack by twofold, B: a little crack by twofold, C: crack over approximately half the diameter by twofold, and D: crack throughout the sample surface by two fold. The teeth biting quality was evaluated according to the following standards: 5: very good, 4: good, 3: fair, 2: slightly poor, 1: poor. In this specification, all quantities in "percentage" are by weight. The testing results are shown in Table 5.

TABLE 5

|  | Control | Sample |
| --- | --- | --- |
| Jelly strength | 135 | 378 |
| Twofold and fourfold | D | A |
| Biting | 1 | 4 |

It is apparent from the above results that by the addition of 1% of the culture filtrate of Actinomyces (Streptomyces albireticuli) to the hake containing spotted jellied condition, it is possible to produce a frozen kneaded meat which can be used as a raw material for a Japanese style fish meat paste ("neriseihin") even after the 6 months storage under freezing conditions. The control had a poor gel forming ability as if it were soybean curd. Thus, it was unsuitable as a raw material for "neriseihin".

EXAMPLE 10

Process for producing frozen kneaded meat

Immediately after Northeast Pacific hake with sporazoa parasites' present therein was caught, fish meat therefrom was collected as a minced meat by a fish meat separator on board the fishing vessel. The minced meat was twice soaked in water and hydroextracted by a screw press to obtain a hydroextracted meat having a moisture content of 81%.

5 Kg of sugar, 300 g of condensated phosphates and 100 g of ammonium persulfate were mixed with 100 Kg of the hydroextracted meat by means of a silent cutter. The resulting mixture was shaped, and the resulting shaped product was rapidly frozen by means of a contact freezer.

As a control, another 100 Kg of the hydroextracted meat was treated according to the procedure described above except that no ammonium persulfate was added.

These hake kneaded meats were brought to land and were stored at −25° C. for 3 months. Thereafter, these meats were tested for elasticity. As a result, the present kneaded meat of the instant example exhibited good quality as is shown in Table 6.

TABLE 6

|  | Jelly strength | Twofold & fourfold | Biting |
| --- | --- | --- | --- |
| This invention | 882 | AA | 5 |
| control | 51 | D | 1 |

EXAMPLE 11

Process for preparing frozen kneaded meat

200 Kg of the frozen fillet of the same Pacific hake as that described in Example 9 was thawed. Then, fish meat was collected from the thawed hake by means of a fish meat separator. The fleshed meat had a proteolytic enzyme activity of 6,800 units. Then, the fish meat was soaked in cold water in a quantity two times that of the meat and drained. The hydroextracted meat thus obtained was divided into two portions. The first portion was soaked in cold water in a quantity two times that of the meat and drained to obtain 50 Kg of hydroextracted meat as a control. The other portion was soaked in 200 l of cold water with 100 g of sodium hydrogensulfite dissolved therein for 10 minutes while the mixture was stirred. Thereafter, the mixture was hydroextracted by means of a centrifuge to obtain 50 Kg of hydroextracted meat as a sample. The control and sample had a proteolytic enzyme activity of 3,200 and 840 units, respectively.

4 Kg of sugar, 0.15 Kg of condensated phosphates and 500 g of lactose were added to 50 Kg of the control, and the mixture was mixed by means of a silent cutter. Each of 10-Kg lot of the mixture was placed in a container and rapidly frozen at $-30°$ C. The frozen meat was removed from the container, packed in a polyethylene bag, and stored in a frozen state for 6 months.

A culture filtrate of Streptomyces roseus (IFO 12818) cultured under the same conditions as those described for the Streptomyces albireticuli in Example 9 was heated at 98° C. for 30 minutes, and the resulting filtrate was filtered on a filtering paper. The filtrate was freeze-dried, and the dried product was pulverized. 450 g of lactose was added to 50 g of the powder and the mixture was uniformly mixed. 500 g of this mixture was added together with sugar and condensated phosphates to the sample in the same manner as that described for the control. The resulting mixture was mixed in the same manner as that described for the control. The resulting mixture was stored in a frozen state for 6 months under the same conditions as those described for the control.

After each of the meats was thawed, it was evaluated for quality under the same conditions as those for the above described method of testing elasticity. The thawed control and sample meats had a proteolytic enzyme activity of 3,100 and 10 units, respectively.

TABLE 7

|  | Control | Sample |
|---|---|---|
| Jelly strength | 90 | 510 |
| Twofold and fourfold | D | A |
| Biting | 1 | 4 |

It is apparent from Table 7 that the control prepared by soaking the hake containing meat with jellied condition in cold water two times and draining it after each soaking had poorer quality than the control of Example 9 and was entirely unsuitable as a raw material for "Neriseihin", whereas the sample whose proteolytic enzyme activity was remarkably reduced by the addition of the material interfering with proteolytic enzyme activity during the soaking and mixing operations had a strong gel forming capability as a raw material for high quality "Neriseihin".

EXAMPLE 12

Process for producing raw kneaded meat and process for producing "Kamaboko" from the raw kneaded meat Fresh yellowfin sole having a large number of spotted jellied condition having a maximum diameter of 1 mm and a minimum diameter of 0.5 mm and containing a number of sporozoa were used as a raw material. 350 Kg of the flatfish was headed and gutted and the meat was collected by means of a fish meat separator. The meat had a proteolytic enzyme activity of 3,350 units. As described in Example 9, this fish meat was twice soaked in cold water in a quantity two times that of the meat and drained to obtain 130 Kg of hydroextracted meat.

A solution of 0.6 g of antipain in 1 l of water was added to 60 Kg of each sample of the hydroextracted meat and the mixture was uniformly mixed. 10 Kg of the mixture was packed in a polyethylene bag to obtain a raw kneaded meat. A control was prepared in the same manner except that 1 l of water alone was added. The sample and control had a proteolytic enzyme activity of 980 and 1,140 units, respectively.

These raw kneaded meats were stored in a refrigerator at a temperature of from 4° to 5° C. for 24 hours. Thereafter, these meats were removed from the refrigerator. Then, 1.5 Kg of sodium chloride, 2.5 Kg of sugar, 4.0 Kg of starch, 1.2 Kg of mirin (sweet sake) and 0.5 Kg of sodium glutamate were added to 50 Kg of each of the raw kneaded meats, and the mixture was ground and formed into "itatuki-kamaboko" according to a conventional method. The ground sample and control had a proteolytic enzyme activity of 23 and 1,080 units, respectively.

These "kamabokos" were evaluated for quality under the same conditions as those for the above described method of testing elasticity. The results are shown in Table 8.

TABLE 8

|  | Control | Sample |
|---|---|---|
| Jelly strength | 128 | 415 |
| Twofold and fourfold | D | A |
| Biting | 1 | 4 |

It is apparent from Table 8 that the raw kneaded meat produced from the yellowfin sole having meat with jellied condition had a poor gel forming capability as if it was soybean-curd and was unsuitable as a raw material for "kamaboko", while the same raw kneaded meat to which 0.01% of antipain had been added had a good mouth feel and elasticity and could be used as a raw material for producing good quality "Kamaboko".

EXAMPLE 13

50 Kg of control Pacific hake kneaded meat with no ammonium persulfate added thereto as in Example 10 which had been stored in a frozen state for 3 months was thawed. 50 Kg of normal pollack kneaded meat, 200 g of sodium nitrite, 3 Kg of sodium chloride, 2 Kg of "Mirin", 2 Kg of sugar and 1 Kg of seasoning were mixed with the thawed meat by a silent cutter. The resulting mixture was shaped and broiled to obtain 120 Kg of broiled chikuwas.

With regard to these chikuwas and commercially available chikuwas, an organoleptic test was carried out by the panels consisting of twenty members by a two-point comparison method. As is apparent from Table 9, there is no significant difference between them at a level of significance of 5.0%.

TABLE 9

| Persons favouring the product of the present invention | 9 |
|---|---|
| Persons favouring the commercial product (control) | 11 |

EXAMPLE 14

Process for preparing "Chikuwa"

Fish meat was collected from North Pacific arrow-toothed flounder (Atheresthes evermanni) containing jellied condition on a ship. The fish meat was twice soaked in water in a quantity two times that of the meat and drained every time the soaking was carried out. 4

Kg of sugar, 4 Kg of sorbitol and 0.3 Kg of condensated phosphates were added to 100 Kg of the hydroextracted meat and the mixture was mixed by means of a silent cutter. Each of 20-Kg lot of the mixture was packaged in a bag by using a packaging machine and rapidly frozen at a temperature of −30° C. Thus, five bags each containing 20 Kg of the frozen kneaded meat were obtained. The frozen kneaded meat was stored in a frozen state for 4 months and thereafter, the meat was thawed and prepared into "Chikuwa". The thawed meat had a proteolytic enzyme activity of 3,700 units.

The thawed meat was divided into two portions each consisting of 50 Kg of the meat. These two portions were ground by means of a silent cutter. 1.4 Kg of table salt, 4.0 Kg of starch, 1.2 Kg of "mirin" and 0.4 Kg of sodium glutamate and 200 ml of water were added to the first portion as a control. 200 ml of the egg white pseudoglobulin fraction (25 g as calculated on a dry GP basis) was added to the other portion as a sample.

The GP fraction is prepared as follows. The egg white having a pH of 9.5 is introduced into a 5% aqueous solution of sodium chloride, and a major portion of lysozyme contained in the egg white is crystallized, the crystal being separated from the solution. Thereafter, ammonium sulfate is added to the solution until it is semi-saturated with ammonium sulfate. The resulting precipitate is collected by means of a centrifuge. The precipitate is dissolved in a 0.25% aqueous solution of sodium chloride, and dialysis is carried out. The resulting ovomucin precipitate fraction is removed by means of a centrifuge. The supernatant liquid is saturated with 0.43% of ammonium sulfate, and a precipitate is allowed to salt out. The resulting precipitate is collected by a centrifuge, and the collected precipitate is dissolved in distilled water. The resulting solution is subjected to dialysis, and the resulting precipitate is removed by a centrifuge. The supernatant liquid is saturated with 0.43% of ammonium sulfate, and a precipitate is allowed to salt out. This salting out and dialysis are each repeated three times. A supernatant liquid obtained by centrifuging the mother liquid remaining after the last dialysis is the GP fraction of the white.

The control and sample pastes had a proteolytic enzyme activity of 1,250 and 200 units, respectively. These pastes were evaluated for elasticity. The results are shown in Table 10.

TABLE 10

|  | Control | Sample |
|---|---|---|
| Jelly strength | 116 | 440 |
| Twofold and fourfold | D | A |
| Biting | 1 | 4 |

The control and sample pastes were formed into "chikuwa" by using an automatic chikuwa forming machine. As a result, it was found that the sample paste gave a chikuwa having almost the same quality as that of a chikuwa prepared by pollack kneaded meat, while the control paste had a low viscosity and was in the form of soybean-curd, and, thus, it could not be formed into "chikuwa" by the chikuwa forming machine.

EXAMPLE 15

Middle-sized sardines (Sardinops melanosticta) caught off Chiba Prefecture were headed and gutted. After the sardines were washed with water, they were subjected to a fish meat separator to obtain minced meats. Frozen hakes caught in the South Pacific Ocean off Chili and having spots of jellied condition were thawed. Fish meat was collected from the thawed hakes by means of a fish meat separator. The meat was soaked in water and hydroextracted to obtain hake kneaded meat.

300 g of sodium chloride, 1 Kg of starch, 100 g of seasoning and 20 g of spice were added to 8 Kg of the sardine minced meat and 2 Kg of the hake kneaded meat. The resulting mixture was ground by means of a grinder. The ground mixture was shaped into spherical masses and these masses were boiled to obtain 12.5 Kg of fish balls.

At the same time, 9 types of fish balls were prepared according to the procedure described above except that 200 cc of a 10% aqueous solution or dispersion of the additives indicated in Table 11 was added during the grinding process.

The resulting fish balls were measured for mouth feel with respect to hardness by using a general food type texturometer at a voltage of 1 V and at a clearance of 3 mm. The fish balls with no additive exhibited a mashed potato-like fragile feel, while the fish balls according to the present invention exhibited a satisfactory resistance force to teeth when biting. The hardness is expressed by the height (cm) of a peak recorded on a recording paper of the texturometer. The higher the height, the greater the resistance to teeth. A height which is no less than about 10 cm signifies a satisfactory resistance force to teeth.

TABLE 11

| Additive | Texturometer hardness (cm) |
|---|---|
| none | 2.8 |
| hydrogen peroxide | 15.2 |
| potassium bromate | 16.4 |
| sodium hypochlorite | 12.8 |
| Bleaching powder | 13.1 |
| hypochlorous acid | 12.2 |
| chlorine dioxide | 16.7 |
| potassium alum | 12.4 |
| calcium oxide | 14.9 |
| benzoyl peroxide | 12.3 |

We claim:

1. A process of treating fish meat contaminated with sporozoa which comprises adding to the fish meat effective inhibiting amounts of at least one food compatible and edible additive which inhibits thiol protease.

2. A process as claimed in claim 1, wherein the substance which inhibits thiol protease is selected from the group consisting of an extract of Actinomycetaceae an extract of an Aspergillus species, antipain, chymostatin, leupeptin, egg white pseudo globlin fraction, sulfites, nitrites, chlorites, hypochlorous acid and salts thereof, bromates, chlorine dioxide, hydrogen peroxide, benzoyl peroxide, ammonium persulfate, calcium oxide and alum.

3. A process as claimed in claim 1, wherein the substance which inhibits thiol protease is added in the form of a liquid by dipping, washing, soaking, coating, spraying, injection, sprinkling or ice glazing.

4. A process as claimed in claim 1, wherein the substance which inhibits thiol protease is added in the form of a solid by mixing with, grinding into, spreading onto, or rousing with the fish meat.

5. A process as claimed in claim 1, wherein the additive which inhibits thiol protease is added in the form of a gas.

6. A process as claimed in any of claims 1 to 4, wherein the substance which inhibits thiol protease are added in combination with effective amounts of at least one penetrating coagent.

7. A process as claimed in claim 6, wherein the penetrating coagent is selected from the group consisting of condensated phosphates, sugar fatty acid esters, sorbitan fatty acid esters, propylene glycol fatty acid esters, glycerol fatty acid esters and propylene glycol.

8. A process as claimed in any of claims 1 to 3, wherein the substance which inhibits thiol protease is added under the irradiation of supersonic waves.

* * * * *